United States Patent
Fuss et al.

(10) Patent No.: US 9,799,368 B2
(45) Date of Patent: Oct. 24, 2017

(54) FLUID-DYNAMIC BEARING SYSTEM

(71) Applicant: Minebea Co., Ltd., Nagano-ken (JP)

(72) Inventors: Thomas Fuss, Rottweil (DE); Tobias Kirchmeier, St. Georgen (DE); Oliver Vogt, Niedereschach (DE)

(73) Assignee: MINEBEA CO., LTD., Nagano-Ken (JP)

( * ) Notice: Subject to any disclaimer, the term of this patent is extended or adjusted under 35 U.S.C. 154(b) by 0 days.

(21) Appl. No.: 14/874,590

(22) Filed: Oct. 5, 2015

(65) Prior Publication Data
US 2016/0115995 A1    Apr. 28, 2016

(30) Foreign Application Priority Data
Oct. 22, 2014 (DE) .................. 10 2014 015 553

(51) Int. Cl.
| | |
|---|---|
| F16C 32/06 | (2006.01) |
| G11B 19/20 | (2006.01) |
| F16C 33/74 | (2006.01) |
| F16C 33/10 | (2006.01) |
| H02K 5/167 | (2006.01) |

(52) U.S. Cl.
CPC ........ *G11B 19/2036* (2013.01); *F16C 33/107* (2013.01); *F16C 33/1085* (2013.01); *F16C 33/743* (2013.01); *F16C 33/745* (2013.01); *H02K 5/1675* (2013.01); *F16C 2370/12* (2013.01)

(58) Field of Classification Search
CPC .. F16C 17/107; F16C 33/107; F16C 33/1085; F16C 33/743; F16C 33/745; F16C 2370/12; F16C 2240/70; G11B 19/2036; H02K 5/167; H02K 5/1675
USPC ........ 384/100, 107, 110, 112, 114, 119, 121; 360/99.08, 98.07; 310/90
See application file for complete search history.

(56) References Cited

U.S. PATENT DOCUMENTS

| | | | | |
|---|---|---|---|---|
| 6,828,709 | B2 * | 12/2004 | Grantz | F16C 17/026 310/90 |
| 6,991,376 | B2 * | 1/2006 | Aiello | F16C 33/107 384/107 |
| 7,063,462 | B2 * | 6/2006 | Aiello | F16C 17/10 384/107 |
| 7,284,910 | B2 * | 10/2007 | Dittmer | F16C 33/103 384/119 |
| 7,517,153 | B2 * | 4/2009 | Engesser | F16C 17/10 384/107 |

(Continued)

FOREIGN PATENT DOCUMENTS

DE    102012005221    9/2013

*Primary Examiner* — Marcus Charles
(74) *Attorney, Agent, or Firm* — Cooper & Dunham LLP

(57) ABSTRACT

A fluid-dynamic bearing system comprising a stationary bearing component (12, 16, 18) and a bearing component (14, 14*a*) rotatable about a rotation axis, wherein, during operation of the bearing, the stationary and rotary components are separated from each other by a bearing gap (20) filled with a bearing fluid, wherein at least one fluid-dynamic radial bearing (22, 24) and at least one fluid-dynamic thrust bearing (28) or, alternatively, at least one conical fluid-dynamic bearing are arranged along the bearing gap (20), and wherein the bearing gap (20) comprises first and second open ends sealed by a first sealing gap (34) and a second sealing gap (36). The second sealing gap (36) exclusively extends normal to the rotation axis (40).

25 Claims, 13 Drawing Sheets

(56) References Cited

U.S. PATENT DOCUMENTS

| | | | | |
|---|---|---|---|---|
| 7,654,744 | B2* | 2/2010 | Obara | F16C 33/107 384/100 |
| 8,562,221 | B2* | 10/2013 | Kim | F16C 33/745 384/100 |
| 8,724,256 | B2 | 5/2014 | Sekii | |
| 8,724,257 | B2* | 5/2014 | Sekii | F16C 33/745 310/90.5 |
| 2004/0070298 | A1 | 4/2004 | Aiello | |
| 2004/0091188 | A1* | 5/2004 | Aiello | F16C 33/107 384/119 |
| 2006/0043808 | A1 | 3/2006 | Son | |
| 2006/0222276 | A1* | 10/2006 | Uenosono | F16C 17/107 384/107 |
| 2013/0330029 | A1* | 12/2013 | Kwon | F16C 33/745 384/121 |

* cited by examiner

FLUID-DYNAMIC BEARING SYSTEM

FIELD OF THE INVENTION

The present invention relates to a fluid-dynamic bearing system, in particular a fluid-dynamic bearing system for the rotatable support of a spindle motor having a low structural height of the type that can be used for driving a structurally flat hard disk drive (HDD) or a fan.

PRIOR ART

Spindle motors as they are used for driving modern hard disk drives as electronic storage media, are miniature motors rotatably supported by means of a fluid-dynamic bearing system. Such a spindle motor comprises a stationary motor component and a rotary motor component, which is rotatably supported relative to the stationary motor component about a rotation axis by means of the fluid-dynamic bearing system. The rotary motor component is rotatably driven in the usual manner by an electromagnetic drive system consisting of a stator with coil windings and a permanently magnetic rotor. As a rule the spindle motor is mounted on a base plate acting as a bottom housing component, which is closable by means of a housing cover.

As a rule, corresponding components of the stationary and rotary motor components are simultaneously formed as bearing components comprising mutually associated bearing surfaces, which are separated from each other by a bearing gap filled with a bearing fluid. Fluid-dynamic radial bearings as well as at least one fluid-dynamic thrust bearing are provided, comprising bearing groove structures associated with the bearing surfaces in the well-known manner, which have a pumping effect on the bearing fluid arranged in the bearing gap when the bearing components move relative to each other. A hydro-dynamic pressure is generated within the bearing gap by the pumping action of the bearing groove structures, which separates the bearing surfaces in operation in an almost frictionless manner, making the bearing capable of support. Fluid-dynamic bearing systems having conical bearings are also well-known.

Spindle motors of the well-known type for driving 2.5 inch hard disk drives have had a structural height of typically about 5 to 15 mm in the past. About 4 to 8 mm thereof are taken up by the fluid-dynamic bearing system, in particular the axially extending section of the bearing gap, along which the fluid-dynamic radial bearings are arranged. About 2 mm of the structural height are taken up by the mounting of the shaft in the bearing component, and a further approx. 1.5 mm is the structural height of the stopper component and its associated covering.

DE 10 2012 005 221 A1 shows various embodiments of a spindle motor having a low structural height with a fluid-dynamic bearing system and stationary shaft, wherein the spindle motor comprises a base plate in which a first bearing component is received which is approximately U-shaped in cross section. A shaft is mounted in a central opening of this U-shaped bearing component. The shaft can also be integrally formed with the U-shaped bearing component. A so-called stopper component is arranged at the free end of the shaft, which is integrally formed with the shaft. A rotor component of the spindle motor rotates in the space between the bearing component, the shaft and the stopper component, which is separated from the stationary motor components, i.e. the bearing component, the shaft and the stopper component, by a bearing gap. The bearing gap is filled with a bearing fluid, and corresponding fluid-dynamic radial bearings and thrust bearings are arranged along this bearing gap. The bearing gap has two open ends each sealed by sealing arrangements, preferably capillary sealing arrangements. At its top end, the shaft comprises respective means by which it is attached to the housing cover of the spindle motor, or of the hard disk drive, by means of an associated screw. The rotor component is driven by an electromagnetic drive system comprising a stator arrangement arranged on the base plate and a rotor magnet mounted on an inner circumference of the rotor component opposite the stator arrangement.

Mobile electronic devices which usually comprise storage media, such as laptops, notebooks, netbooks, notepads, tablet PCs and other devices, are becoming ever smaller and flatter in structure so that, correspondingly, hard disk drives and spindle motors having a very small structural height are required for installation in these devices. The spindle motors thus have to keep up with the development of mobile devices, wherein a structural height of the spindle motor of about 5 mm to 7 mm is desirable. To achieve this, substantial structural challenges have to be overcome. On the one hand, the radial bearing span should be reduced as little as possible so that the stability of the bearing and the bearing stiffness are not compromised, and on the other hand, clamping of the shaft in the bearing component, or the structural height of the stopper component, must not be too small since otherwise the necessary connecting forces can no longer be ensured between the components. Furthermore, the capillary bearing gaps need sufficient structural space so that sufficient sealing action is ensured even under shock stress.

The structural space, in particular, for the bearing gap provided in the area of the stopper component is exceedingly limited so that this axially extending sealing gap can only insufficiently perform its sealing function—in particular under high shock stresses. To prevent leakage of bearing fluid from the bearing gap, the sealing gap must not be shorter than the minimum length.

DISCLOSURE OF THE INVENTION

It is thus the object of the invention to provide a fluid-dynamic bearing system having a small structural height, which withstands high shock stresses in terms of the sealing of the bearing gap.

The object is achieved according to the present invention by a fluid-dynamic bearing system having the features of claim 1.

Preferred embodiments of the invention and further advantageous features are the subject matter of the dependent claims.

The above-described fluid-dynamic bearing system comprises a stationary bearing component and a bearing component rotatable about a rotation axis, wherein, during operation of the bearing, the stationary and rotary components are separated from each other by a bearing gap filled with a bearing fluid. At least one fluid-dynamic radial bearing and at least one fluid-dynamic thrust bearing or, alternatively, at least one conical fluid-dynamic bearing are arranged along the bearing gap. The bearing gap comprises first and second open ends sealed by a first sealing gap and a second sealing gap.

According to the invention, the second sealing gap exclusively extends normal to the rotation axis.

The second sealing gap is defined by opposing surfaces of the stopper component and the bearing sleeve and extends in a radial direction below the stopper component. The stopper component has its diameter adapted correspondingly to create a sufficient length of the second sealing gap.

The first sealing gap sealing the other side of the bearing gap is arranged almost parallel to the rotation axis.

The second sealing gap is directly contiguous with the bearing gap and extends from an inner diameter a normal to the rotation axis radially outward to an outer diameter d. The diameters a and d are measured normal to the rotation axis.

Herein, the second sealing gap preferably comprises a plurality of sections.

A first section of the second sealing gap extends radially outward and is directly adjacent to the bearing gap. The first section begins at a diameter a and ends at a diameter b. Diameter a is preferably equal to the inner circumference of the bore of the rotary bearing component, while diameter b is equal to the diameter on which the radially outermost area of the upper opening of a recirculation channel is situated.

A second section of the second sealing gap extends starting from diameter b radially outward to a diameter c. Preferably diameter c is equal to the diameter at which the radially extending surface of the bearing sleeve transitions into a surface obliquely extending downwards.

A third section of the second sealing gap extends from diameter c radially outward to outer diameter d. Diameter d is preferably equal to the outer circumference of the stopper component.

A fourth section of the second sealing gap extends from diameter b to a diameter b1. Preferably, diameter b1 is arranged between diameter b and diameter c.

A fifth section of the second sealing gap extends from diameter b1 to diameter c.

A sixth section of the second sealing gap extends from a diameter b2 to diameter c. Preferably, diameter b2 is arranged between diameter b1 and diameter c.

For the diameters, generally: $a<b<b1<b2<c<d$.

According to the invention the second sealing gap may comprise less than six sections. For example, only two sections may be provided along the second sealing gap, wherein, for example, the first and second sections form a common section of the second sealing gap, or the second and third sections form a common section of the sealing gap.

An opening of the recirculation channel can, for example, open out into the first section of the second sealing gap, which connects this first section of the second sealing gap with a remote section of the bearing, in particular a gap section between the bearing gap and the first sealing gap.

In the radially outer area of the first section, optionally, a circumferential groove can be provided. It improves the behavior of the fluid-dynamic bearing under shock stress.

Along the second section of the second sealing gap, a dynamic pump seal can be arranged, which is characterized by pump grooves, which are arranged on at least one of the surfaces of the stopper component or the bearing sleeve defining the second section. However, the second section of the second sealing gap may also comprise no dynamic pump seal. A dynamic pump seal can also be optionally provided along the fifth section of the second sealing gap.

The third, outer section of the second sealing gap can preferably be formed as a conical capillary seal, having a cross-section which increases starting from diameter c to diameter d.

A dynamic pump seal is preferably not provided along the fourth section of the second sealing gap. This section serves as a so-called quiet zone minimizing the risk of air being introduced into the bearing.

The sixth section of the second sealing gap preferably comprises a greater gap width than the sections situated radially further inward. This can be advantageous for preventing the stopper component from impacting on the bearing sleeve in operation and damaging these components, since there is usually no bearing fluid in this section during operation.

The second sealing gap is at least partially filled with bearing fluid. When the bearing is in the resting state, that is when the bearing is not rotating, the first, second, fourth, fifth and sixth sections of the second sealing gap can be completely filled with bearing fluid, while the third section of the second sealing gap is only partially filled with bearing fluid. When the bearing is in operation, i.e. during rotation of the bearing, the first and fourth sections of the second sealing gap can be completely filled with bearing fluid, while the second and fifth sections are only partially filled with bearing fluid and the third and sixth sections are free of bearing fluid. The second and fifth sections may also be temporarily free of bearing fluid.

The gap widths of the first, second, fourth and fifth sections of the second sealing gap have essentially the same size and are a few to about 10 μm wide. The gap width of the sixth section of the second sealing gap can be 20 μm, for example.

The gap width of the third section of the second sealing gap has preferably a conical cross section and expands radially outward starting from the second or fifth or sixth section.

Overall, the gap width of the second sealing gap must be dimensioned in such a way that the dynamic pump seal can have a sufficient effect to enable the bearing fluid present in the second or fifth section of the second sealing gap to be conveyed radially inwardly towards the bearing gap.

A further possibility of providing a fluid-dynamic bearing system having a small structural height, which withstands high shock stress with respect to the sealing of the bearing gap, is to adapt the design of a cover which is attached on the edge of the rotary bearing component and additionally protects the bearing against leakage of bearing fluid in this area.

BRIEF DESCRIPTION OF THE DRAWINGS

FIG. 3 a shows a plan view of the section of the bearing system shown in FIG. 3.

DESCRIPTION OF PREFERRED
EMBODIMENTS OF THE INVENTION

Figure 1:
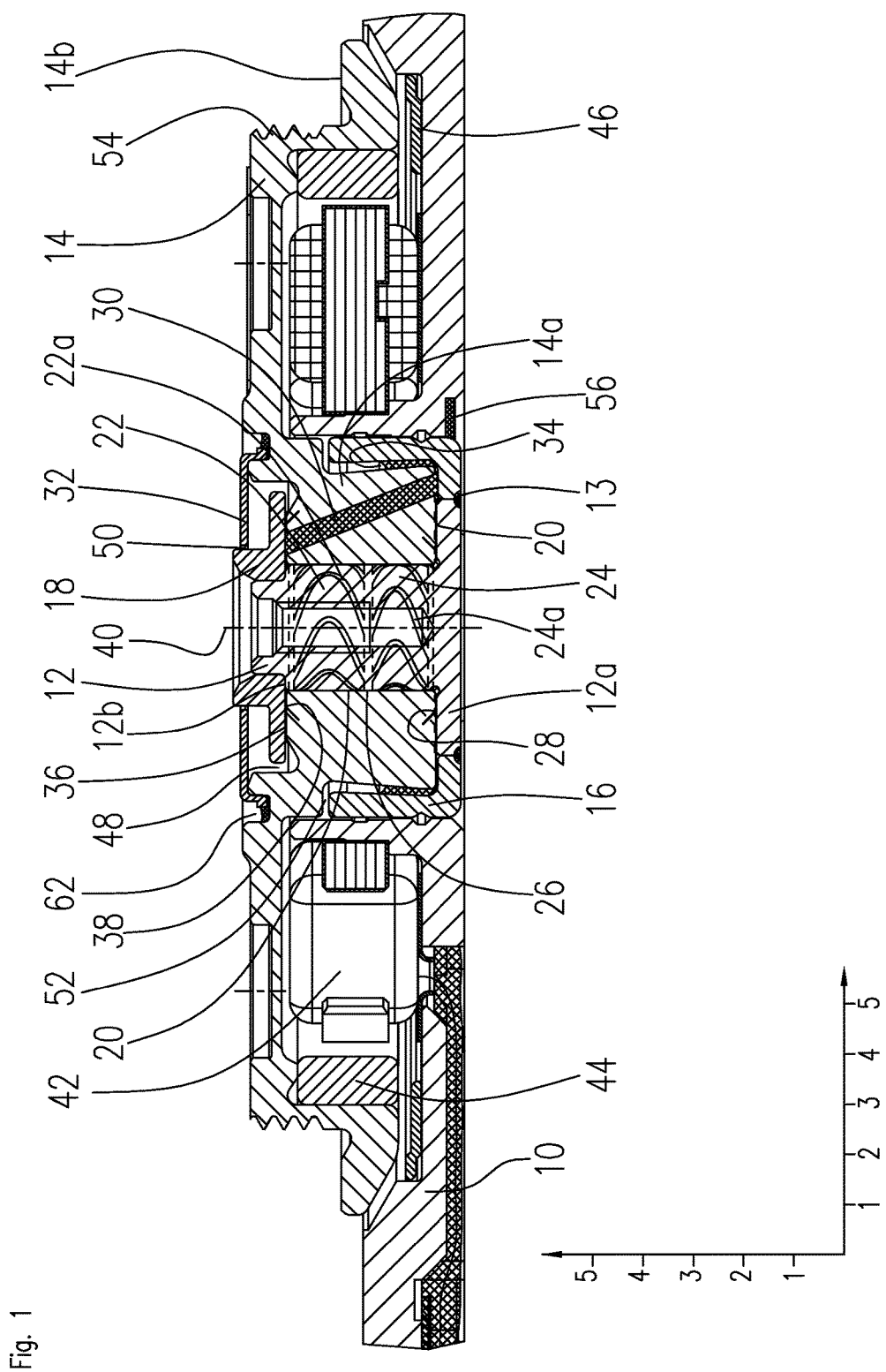
FIG. 1 shows a sectional view of a spindle motor with a preferred embodiment of a fluid-dynamic bearing according to the present invention.

FIG. 1 shows a spindle motor having a small structural height rotatably supported by means of a fluid-dynamic bearing system according to the present invention. Such a spindle motor can be used for driving storage disks of a hard disk drive. By way of example, a fluid-dynamic bearing system and a spindle motor are described for a 2.5 inch hard disk drive.

The spindle motor shown in FIG. 1 comprises a base plate 10, including an essentially central cylindrical opening in which an approximately sleeve-shaped stationary bearing component 16 is fixed. The stationary bearing component 16 is formed to be approximately U-shaped in cross section and includes a central opening. The stationary bearing component 16 is arranged, for example, with a transition fit in the opening of the base plate 10, and is preferably additionally fixed with an adhesive in the opening of the base plate 10. To avoid static charging of the rotary motor components, a conductive adhesive 56 is applied between the base plate 10 and the stationary bearing component 16 at least at one place along the circumference of the stationary bearing component 16.

A cylindrical shaft 12 is provided, having a flange 12a at one end, so that the shaft 12 has an approximately T-shaped configuration in cross-section. The flange 12a of the shaft is fixed in the central opening of the stationary bearing component 16, wherein the flange 12a, with its outer circumference, is adjacent to the inner circumference of the bearing component 16 and preferably metallurgically or adhesively bonded to the latter. This metallurgical or adhesive bond can be, for example, a circumferential welding seam 13. The stationary bearing component 16 can also be integrally formed with the flange 12a of the shaft 12. However, this makes machining of the surfaces of the shaft 12 and the flange 12a more difficult. The bipartite configuration of the flange 12a and the bearing component 16 enables much easier machining of the bearing surfaces present on the outer circumference of the shaft 12 and the top end face of the flange 12a. The cylindrical portion of the shaft 12 extends upwards in the axial direction from the radially extending base of the flange 12a.

An annular stopper component 18 is arranged on the free end of the shaft 12, having a diameter substantially larger than the diameter of the shaft 12 and preferably frictionally or metallurgically connected to the shaft 12. The shaft 12, on its free end in particular, has a reduced diameter, so that a step 12b is formed. This step 12b defines a stop on which the stopper component 18 abuts. The stopper component 18 can thus be precisely arranged and aligned on the shaft 12, ensuring sufficient retaining force in the axial direction downwards. Furthermore, an axial space for receiving a bearing sleeve 14a is defined by step 12b of the shaft 12. The shaft 12 with the flange 12a, together with the bearing component 16 and the stopper component 18 form a compact arrangement, which forms the stationary bearing component of the spindle motor.

The spindle motor comprises a rotor component 14 on which the cylindrical bearing sleeve 14a is preferably integrally arranged. The bearing sleeve 14a has a cylindrical bearing bore, in which the shaft 12 is received. The diameter of the bearing bore is a few micrometers larger than the diameter of the shaft 12. The bearing sleeve 14a of the rotor component 14 is arranged rotatable about the shaft and the rotation axis 40 relative to components 12, 12a, 16, 18, in a space formed by the shaft 12, the flange 12a and the two components 16, 18. The stopper component 18 is at least partially arranged in an annular recess of the rotor component 14.

A bearing gap 20, open on both sides, having a gap width of a few micrometers is formed between corresponding surfaces of the bearing sleeve 14a and opposite surfaces of the shaft 12, the flange 12a and the bearing component 16, which can be in contact at standstill or at low speeds. The bearing gap 20 is filled with a bearing fluid, such as bearing oil.

At the inner circumference of the bearing bore arranged in the bearing sleeve 14a, two cylindrical radial bearing surfaces are formed, which are axially separated from each other by a separator section 26. The radial bearing surfaces surround the stationary shaft 12 at a spacing of preferably 1.5 to 3.5 μm while forming an axially extending section of the bearing gap 20, and form two fluid-dynamic radial bearings 22, 24 with respectively opposing bearing surfaces of the shaft 12. The bearing surfaces of the two radial bearings 22, 24 are provided with sinusoidal, chevron or parabolic (herringbone) bearing groove structures 22a, 24a. The top radial bearing 22 is mainly symmetrically formed, which means that the portion of the bearing groove structures 22a which is arranged above the apex has about the same length as the bottom portion of the bearing grooves 22a. The pumping action of the two portions of the radial bearing grooves 22a is directed towards the apex, i.e. to the bearing center, so that the radial bearing 22 is capable of support. However, due to the symmetrical configuration of the radial bearing grooves 22a of the top radial bearing 22, no defined pumping direction acts on the bearing fluid in the bearing gap 20. In contrast, the bottom radial bearing 24 is asymmetrically formed in so far as the portion of the bearing groove structures 24a arranged below the apex has a greater length than the top portion of the radial bearing grooves 24a. On the one hand, this results in a pressure increase within the bearing fluid towards the apex of the radial bearing 24, thus making the radial bearing 24 capable of support, on the other hand, a defined pump action is exerted on the bearing fluid present in the bearing gap 20 which conveys the bearing fluid axially upwards towards the top radial bearing 22. The separator gap 26 has a substantially greater gap width in comparison with the axial section of the bearing gap 20.

The axially extending section of the bearing gap 20 transitions into a radially extending section below the bottom radial bearing 24, along which radially extending section the fluid-dynamic thrust bearing 28 is arranged. The thrust bearing 28 is formed by radially extending bearing surfaces on the end face of the bearing sleeve 14a and corresponding opposite bearing surfaces of the flange 12a of the shaft 12.

The bearing surfaces of the thrust bearing 28 are formed as circular rings normal to the rotation axis 40. The fluid dynamic thrust bearing 28 is characterized, for example, by spiral-shaped bearing groove structures in the well-known manner, which can be formed either on the end face of the bearing sleeve 14a, the flange 12a or on both parts. When the bearing is in operation, the bearing groove structures generate a pumping action on the bearing fluid present in the bearing gap 20 towards the inside of the bearing, i.e. towards the shaft 12.

Preferably, the thrust bearing surface is only arranged between the radially extending surface of the flange 12a and the opposite underside of the bearing sleeve 14a. The adjacent and also radially extending surface of the stationary bearing component 16 is preferably arranged about 10 to 100 μm below the radially extending surface of the flange 12a, thus creating an annular gap with a correspondingly greater gap width between the radially extending surfaces of the bearing sleeve 14a and the stationary bearing component 16 in the assembled state of the fluid-dynamic bearing.

Advantageously, all bearing groove structures necessary for the radial bearings 22, 24 and the thrust bearing 28 are arranged on corresponding bearing surfaces of the bearing sleeve 14a, which simplifies manufacture of the bearing, in particular the high precision bearing surfaces on the shaft 12 and the flange 12a. Preferably, the thrust bearing grooves open out into the annular gap radially outwardly, which has a larger gap width than the thrust bearing gap. A recirculation channel 30 opens out into the annular gap, which is provided within the bearing sleeve 14a. The recirculation channel 30 extends starting from the annular gap obliquely upwards through the bearing sleeve 14a and opens out into a radially extending second sealing gap 36 between the end face of the bearing sleeve 14a and an opposite end face of the stopper component 18. The second sealing gap 36 will be described in detail further below.

A first capillary sealing gap 34 partially filled with bearing fluid extends contiguous with the radial section of the bearing gap 20 in the area of the thrust bearing 28, or the annular gap. The first sealing gap 34 is linked with the bearing gap 20, is defined by mutually opposing and essentially axially extending surfaces of the bearing sleeve 14a and the bearing component 16, and seals the bearing gap 20 on this side. The first sealing gap 34 comprises the short radially extending section of the annular gap, widened with respect to the bearing gap 20, which is arranged radially outward from the thrust bearing 28. The short radially extending section of the first sealing gap 34 transitions into a longer conically expanding and almost axially extending section, which is defined by an outer circumferential surface of the bearing sleeve 14a and an inner circumferential surface of the bearing component 16. Apart from its function as a capillary seal, the first sealing gap 34 serves as a fluid reservoir and provides the amount of fluid needed during the useful life of the bearing system. Furthermore, filling tolerances and any thermal expansion of the bearing fluid can be compensated. The two surfaces of the bearing sleeve 14a and the bearing component 16 defining the conical section of the first sealing gap 34, can both be inclined towards the inside relative to the rotation axis 40 along the extension of the first sealing gap 34 towards the outside of the bearing. The angle of inclination is preferably between 0° and 5°. The angle of inclination of the outer circumferential surface of the bearing sleeve 14a is greater than the angle of inclination of the inner circumferential surface of the bearing component 16, thus resulting in a conical expansion of the capillary seal. By these means, the bearing fluid is pressed towards the inside towards the bearing gap 20 as the bearing rotates, due to the centrifugal force.

At the top end of the first sealing gap 34, an axially extending air gap bends off in the radial direction. The air gap is defined by an outer circumferential surface of the bearing sleeve 14a and an inner circumferential surface of the bearing component 16 and forms a gap seal 52. This seal 52 on the one hand prevents leakage of bearing fluid from the first sealing gap 34 and also prevents excessive evaporation of the bearing fluid from the area of the first sealing gap 34, which increases the useful life of the fluid bearing.

Figure 2:
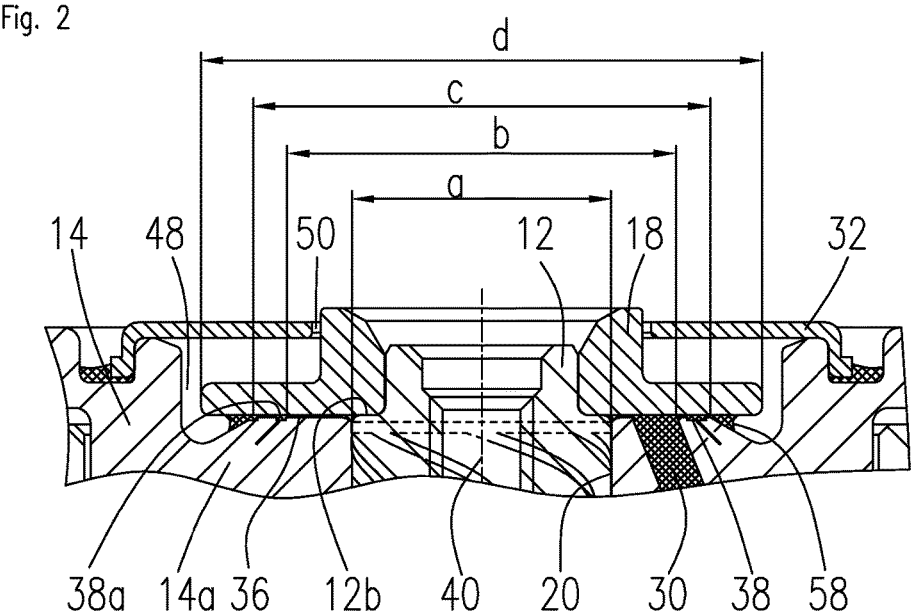
FIG. 2 shows an enlarged sectional view of the bearing system of FIG. 1 in the area of the second sealing gap.

As can be seen, in particular, from FIG. 2, the rotor component 14, or the bearing sleeve 14a is formed on the other side of the bearing system adjacent to the top radial bearing 22 in such a way that it first forms a radially extending surface to which a surface is contiguous which extends obliquely downwards. The surface extending radially or obliquely downwards forms a radially extending second sealing gap 36, which conically expands in the radially outer region, with an opposite, radially extending surface of the stopper component 18. The second sealing gap 36 is linked to the bearing gap 20, is partially filled with bearing fluid and seals the bearing gap 20 at this end. Starting from the bearing gap 20, the second sealing gap 36 begins at an inner diameter a, at the inner circumference of the bore of the bearing sleeve 14a, and ends at an outer diameter d, at the outer circumference of the stopper component 18. Preferably, the second sealing gap 36 essentially comprises three sections.

A first section ab of the second sealing gap 36 begins at the end of the bearing gap 20 at diameter a measured from the rotation axis 40 and extends radially outward up to a diameter b. Diameter a is thus equal to the inner circumference of the bore of the bearing sleeve 14a, while diameter b describes the diameter on which the radially outermost area of the upper opening of the recirculation channel 30 is situated. The top opening of this recirculation channel 30 preferably opens out into this first section ab of the second sealing gap 36.

Contiguous to the first section of the second sealing gap is a second section bc, beginning at diameter b and extending radially outward to a diameter c. Diameter c is equal to the diameter at which the radially extending surface of the bearing sleeve 14a transitions into a surface extending obliquely downward. This second section bc is a continuation of the first section ab and has essentially the same gap width. According to a preferred embodiment of the invention, a dynamic pump seal 38 can be arranged along this section bc. The dynamic pump seal 38 comprises groove structures arranged on the surface defining the section bc of the second sealing gap 36 of the stopper component 18 or preferably the surface of the bearing sleeve 14a. While the bearing is rotating, the groove structures of the pump seal 38 cause a pumping action on the bearing fluid present in the sealing gap 36. This pumping action is directed towards the inside of the bearing, thus towards the bearing gap 20, and conveys the bearing fluid towards the bearing gap 20. As an alternative, the pump seal can be dispensed with (not shown in the drawings).

The second section bc of the second sealing gap 36 is followed by a third section cd extending radially outward from diameter c up to diameter d. The third section cd of the second sealing gap 36 is preferably a capillary sealing gap having a conical cross-section, i.e. the cross-section of section cd continuously expands starting from diameter c up to diameter d. During standstill of the bearing, a portion of section cd is preferably filled with bearing fluid, wherein the surface of the bearing fluid forms a meniscus 58. When the bearing is caused to rotate, the dynamic pump seal 38 conveys the bearing fluid contained in sections bc and cd of the second sealing gap 36 radially inwardly towards section ab, or the bearing gap 20, so that in this case, usually, sections bc and cd do not contain any bearing fluid, while section ab of the second sealing gap 36 as well as the bearing gap 20 remain filled with bearing fluid since the recirculation channel 30 also opens out into section ab.

The opening of the second sealing gap 36 as well as the greatest part of the stopper component 18 are covered by an annularly profiled cover 32. The cover 32 is set on an edge of the rotor component 14 and is bonded there, for example, wherein the cover 32 contacts the circumferential edge of the rotor component 14. The rotor component 14 comprises a groove 62 into which the necessary adhesive can be applied. Then inner edge of the cover 32, together with the outer circumference of the stopper component 18, forms an air gap as a gap seal 50. This gap seal 50 provides increased protection against leakage of bearing fluid from the second sealing gap 36, or reduces evaporation of the bearing fluid and thus increases the useful life of the fluid bearing.

Between the outer circumference of the stopper component 18 and the inner circumference of the edge of the rotor component 14, an axially extending gap 48 is formed, which is preferably 200 μm wide and via which the bearing is filled with bearing fluid. To achieve this, the bearing is arranged in a vacuum chamber, and the bearing gap 20 and the sealing gaps 34, 36 are evacuated. Then the entire volume of bearing fluid is filled into section cd as well as the axially extending gap 48. Subsequently, the vacuum chamber is filled with air, causing the volume of bearing fluid to be pressed from the axially extending gap 48 into the bearing gap 20 and the sealing gaps 34, 36. Alternatively, the axially extending gap between the stopper and rotor components can be chosen to be narrow, such as 12 μm. In this case, pump grooves have to be arranged along this gap. The bearing is also evacuated for filling. Subsequently, it is caused to rotate and the bearing fluid is applied to the narrow gap. The bearing fluid is conveyed into the inside of the bearing by the pump grooves. Subsequently, the bearing can be exposed to air again.

The spindle motor comprises an electromagnetic drive system which is formed in the well-known manner by a stator arrangement 42 arranged on the base plate 10, and an annular permanent magnet 44 concentrically surrounding the stator arrangement 42 at a distance, which is arranged on an inner circumferential surface of the rotor component 14. An external-rotor motor is thus created, while, however, alternatively an internal-rotor motor could also be used without limitation, wherein the stator arrangement is radially outward from the rotor magnet.

Since the spindle motor preferably only comprises a single fluid-dynamic thrust bearing 28, which creates a force on the rotor component 14 that is directed toward the stopper component 18, a corresponding counterforce or biasing force is necessary for holding the rotor component 14 in axial force equilibrium. To achieve this, the stator arrangement 42 and the rotor magnet 44 are axially offset with respect to each other in such a way, that the magnetic center of the rotor magnet 44 is arranged at a greater axial distance from the base plate 10 than the center of the stator arrangement 42. This causes an axial force to be exerted on the rotor component 14 by the magnet system of the motor, which counters the bearing force of the thrust bearing 28 in the operation of the same. Furthermore, as an alternative or in addition to the offset of the drive system, an attractive plate 46 of a ferromagnetic material fixed on the base plate can be provided below the rotor magnet 44. The attractive plate 46 is magnetically attracted by the rotor magnet 44 so that an axial magnetic force is created which acts on the rotor component 14, counteracting the bearing force of the fluid-dynamic thrust bearing 28.

The spindle motor can preferably be used for driving a hard disk drive, wherein one or more storage disks (not shown) can be mounted on the rotor component 14. The storage disk is placed on an outer flange 14b of the rotor component 14. The storage disk is fixed on the rotor component 14 by means of a threaded ring which is screwed onto a thread 54 on the outer circumference of the rotor component 14.

Figure 2A:
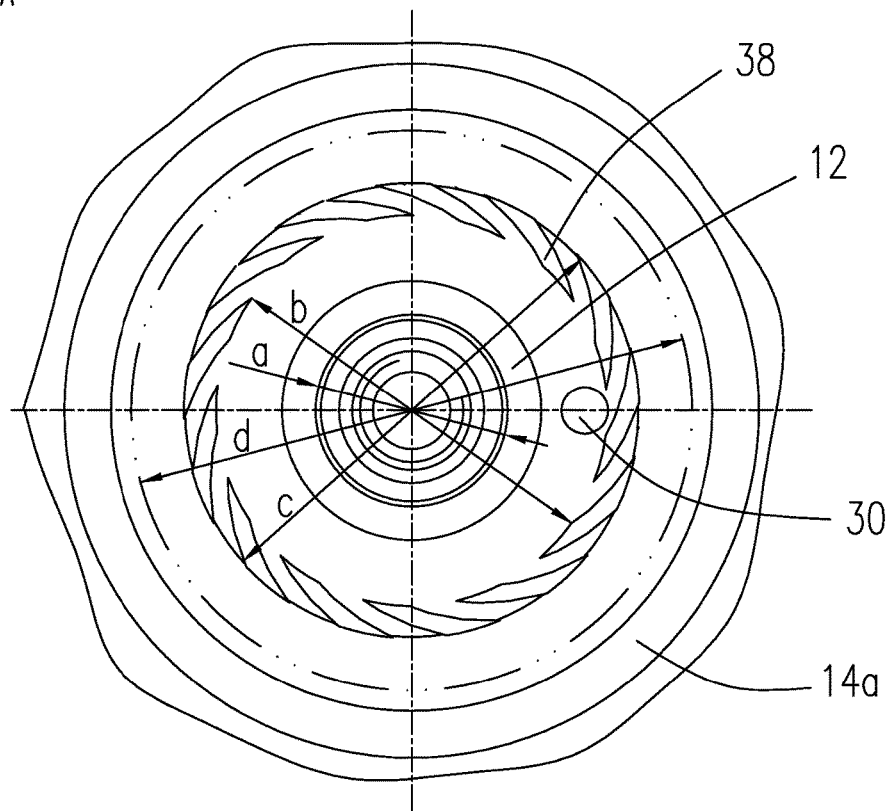
FIG. 2A shows a plan view of the section of the bearing system shown in FIG. 2.

FIG. 2A shows a plan view of the section of the bearing system shown in FIG. 2. It shows the first section ab into which the top end of the recirculation channel 30 opens out, the second section bc in which the optional pump seal 38 is arranged, and a third section cd in which the second sealing gap 36 is conically expanded.

Figure 3:
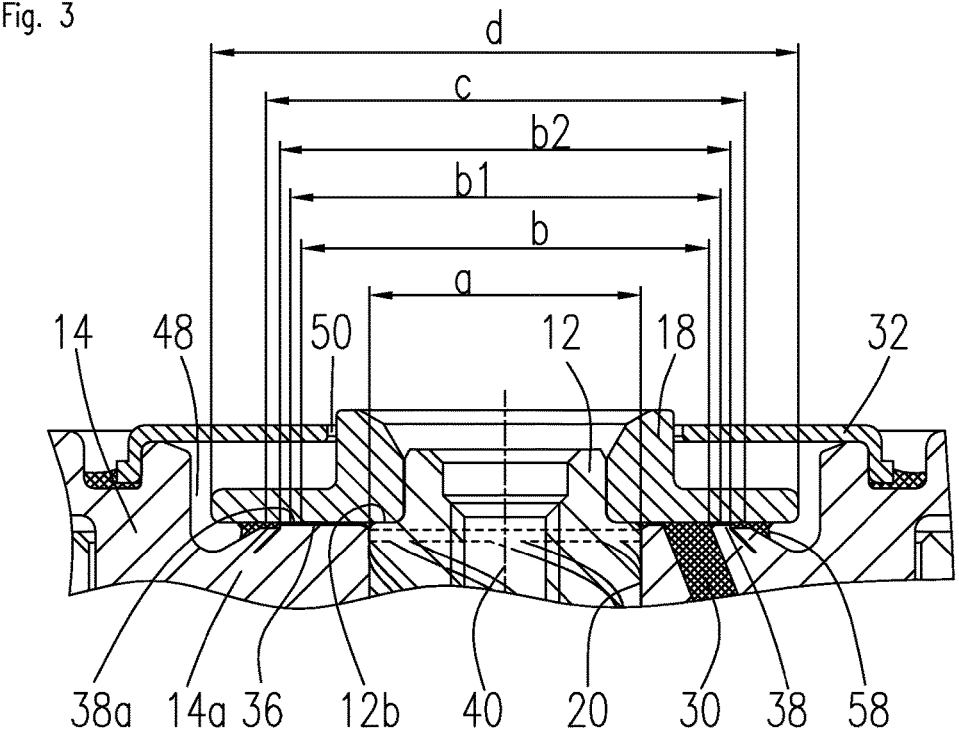
FIG. 3 shows an enlarged sectional view of the bearing system of FIG. 1 in the area of the second sealing gap according to a modified embodiment of the invention.

FIG. 3 shows a modified embodiment of the invention. Unlike FIG. 2, the surface of the bearing sleeve 14a does not continuously extend to diameter c in a straight line, but has a step downwards at a diameter b2. The sixth section b2c of the second sealing gap 36 thus has a greater gap width than the first section ab, for example, into which the recirculation channel 30 opens out.

The enlarged gap width of section b2c of the second sealing gap 36 as compared to section ab can be advantageous to prevent the stopper component 18 from abutting on the bearing sleeve 14a during operation of the bearing and thus damaging these parts, since generally there is no bearing fluid in the outer sections of the sealing gap 36 during operation of the bearing.

Along the fifth section b1c beginning at a diameter b1, which is between diameter b and diameter b2, and ending at diameter c, preferably a dynamic pump seal 38 is arranged, for example consisting of spiral-shaped pump structures arranged on the surface of the bearing sleeve 14a and/or on the opposite surface of the stopper component 18.

The fourth section bb1 forms a so-called quiet zone between section ab and section b1c of the second sealing gap 36. It has the same gap width as the first section ab. However, no pump grooves are arranged along this section bb1. This minimizes the risk of air being introduced into the bearing.

The surfaces of the stopper component 18 and the edge of the rotor component 14 defining the axial gap 48 have a ramp at their upper end, facilitating filling of the bearing via the axial gap 48.

Figure 3A:
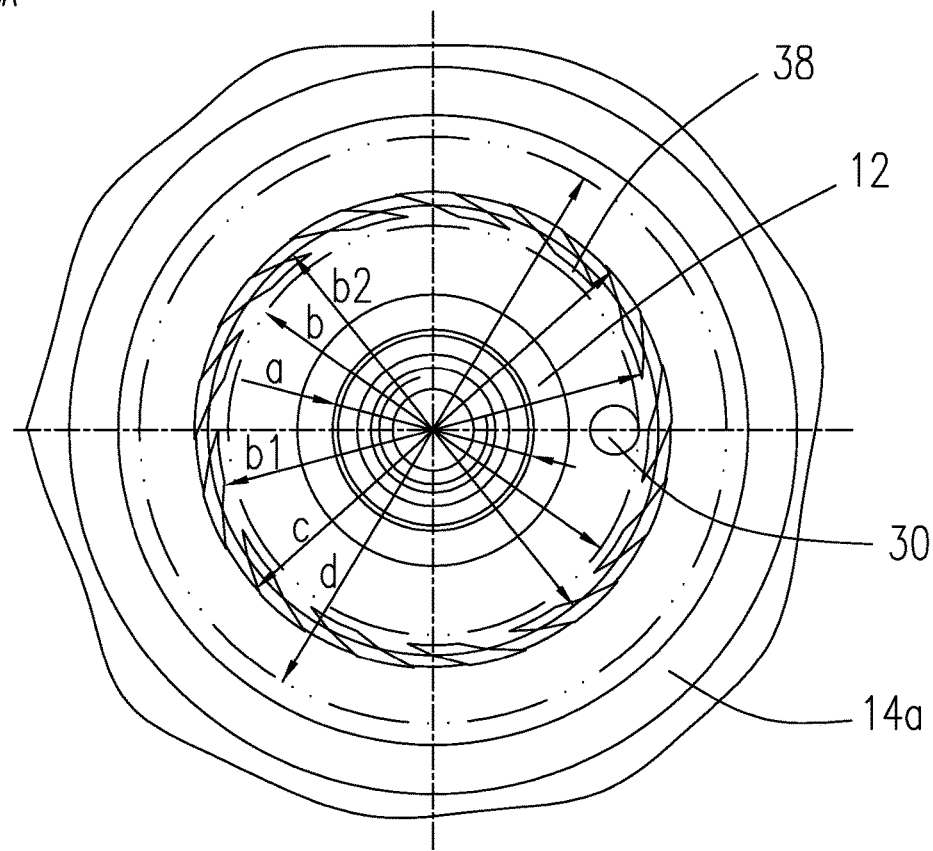

FIG. 3A shows a plan view of the section of the bearing system shown in FIG. 3. In succession from the center outwards, it shows the shaft 12, followed by section ab, into which the top end of the recirculation channel 30 opens out, followed by section bb1, the so-called rest zone, followed by sections b1c and b2c, along which the pump seal 38 is arranged and each having a different width, and finally followed by section cd, which forms the conical end of the second sealing gap 36.

Figure 4:
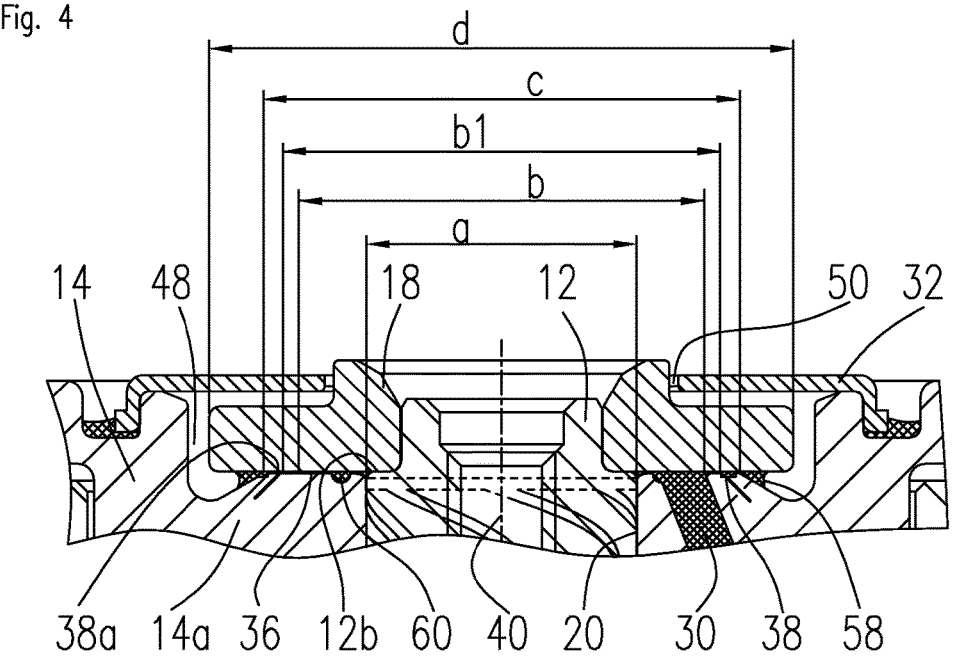
FIG. 4 shows an enlarged sectional view of the bearing system of FIG. 1 in the area of the second sealing gap according to a modified embodiment of the invention.

FIG. 4 shows a modified embodiment of the invention. The surface of the bearing sleeve 14a extends up to diameter c in a continuous fashion and, unlike FIG. 3, it does not have a step. Sections ab, bb1 and b1c thus have the same gap width.

In first section ab, in its radially outwardly situated area, a circumferential groove 60 is arranged, which improves the behavior of the bearing under shock.

A further difference with respect to FIGS. 2 and 3 is that the axial distance between the cover 32 and the stopper component 18 is reduced.

Figure 4A:
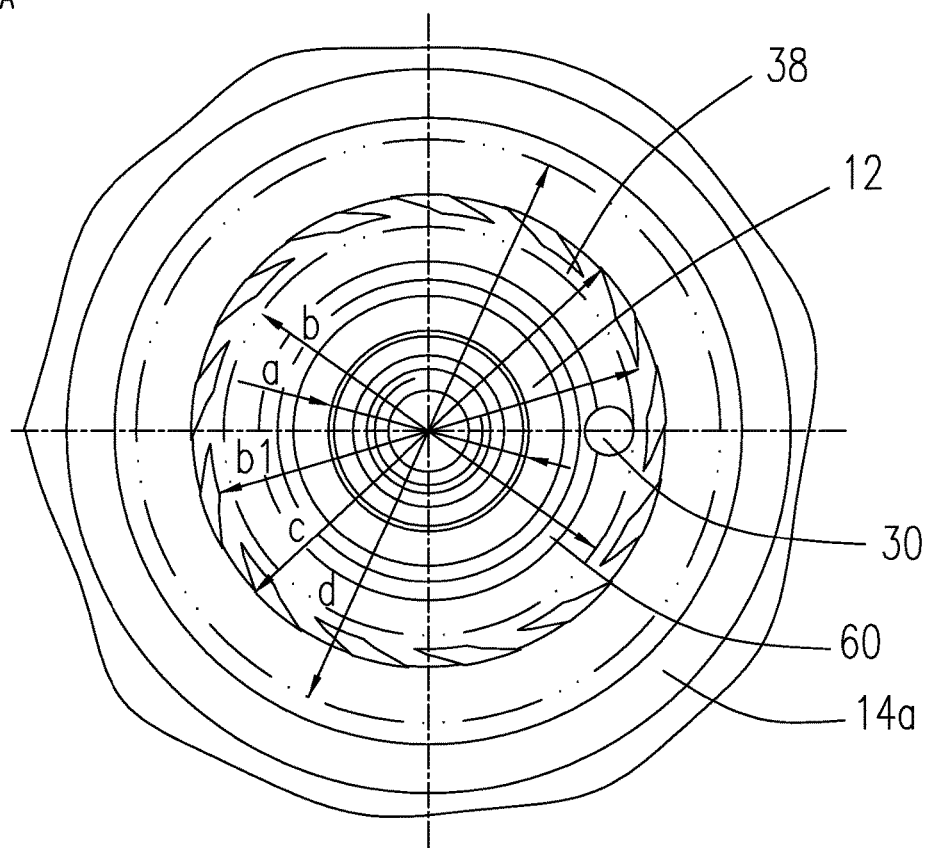
FIG. 4A shows a plan view of the section of the bearing system shown in FIG. 4.

FIG. 4A shows a plan view of the section of the bearing system shown in FIG. 4. It shows section ab in which the circumferential groove 60 is arranged and into which the top end of the recirculation channel 30 opens out, section bb1 serving as a quiet zone, section b1c in which the optional pump seal 38 is arranged, and section cd in which the second sealing gap 36 conically expands.

The exemplary dimensions specified in the following refer to a fluid-dynamic bearing system of the type that can be used for rotatably supporting a spindle motor for a 2.5 inch hard disk drive.

The diameters described can be the following: a=2.5 mm, b=3.8 mm, c=4.4 mm and d=5.2 mm. The radial width of the interposed section bb1 can, for example, be 0.15 mm, wherein, in this case, b=3.8 mm and b1=4.1 mm.

The diameter of the shaft 12 is, for example, 2.5 mm. The diameter of the recirculation channel is, for example, 0.4 mm.

The gap width of sections ab, bb1 and b1c can be, for example, 10 μm. If a step is provided in section b2c, the gap width in this section can be 20 μm.

The circumferential groove can have a depth, for example, of 200 μm and a radial extension of 400 μm.

FIGS. 5 to 9 show an enlarged sectional view of the bearing system of FIG. 1 in the area of the second sealing gap each with a modified embodiment of the cover, or the area of the rotor component surrounding the cover.

In FIG. 1, the cover 32 is an annular disc having a rim at its outer edge extending downwards in the axial direction. The inner circumference of the rim is adhesively bonded to the outer circumference of the edge of the rotor component 14. The rotor component has a circumferential upward bulge at the edge of the groove 62, into which the adhesive can be introduced.

Figure 5:
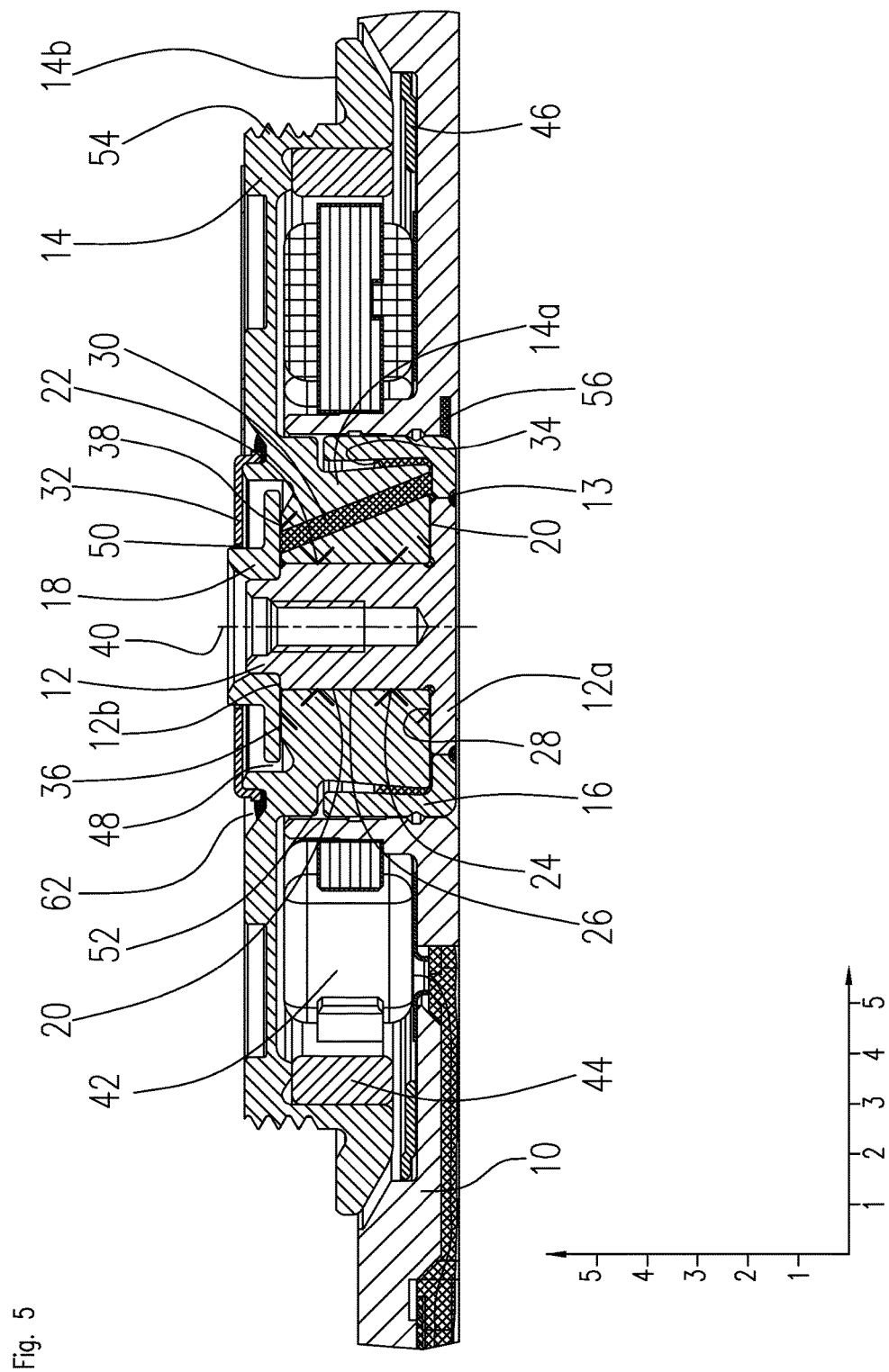
FIGS. 5 to 9 show an enlarged sectional view of the bearing system of FIG. 1 in the area of the second sealing gap, each showing a modified embodiment of the cover.

In FIG. 5, the groove 62 has a modified configuration in comparison to FIG. 1. Its radial extension is smaller, its outer edge is not parallel to the rotation axis 40, but at an oblique angle, and the upward bulge at the outer edge of the groove 62 is omitted, so that the end face of the rotor component 14 has a planar configuration from the outside toward the inside up to the groove 62.

Figure 6:
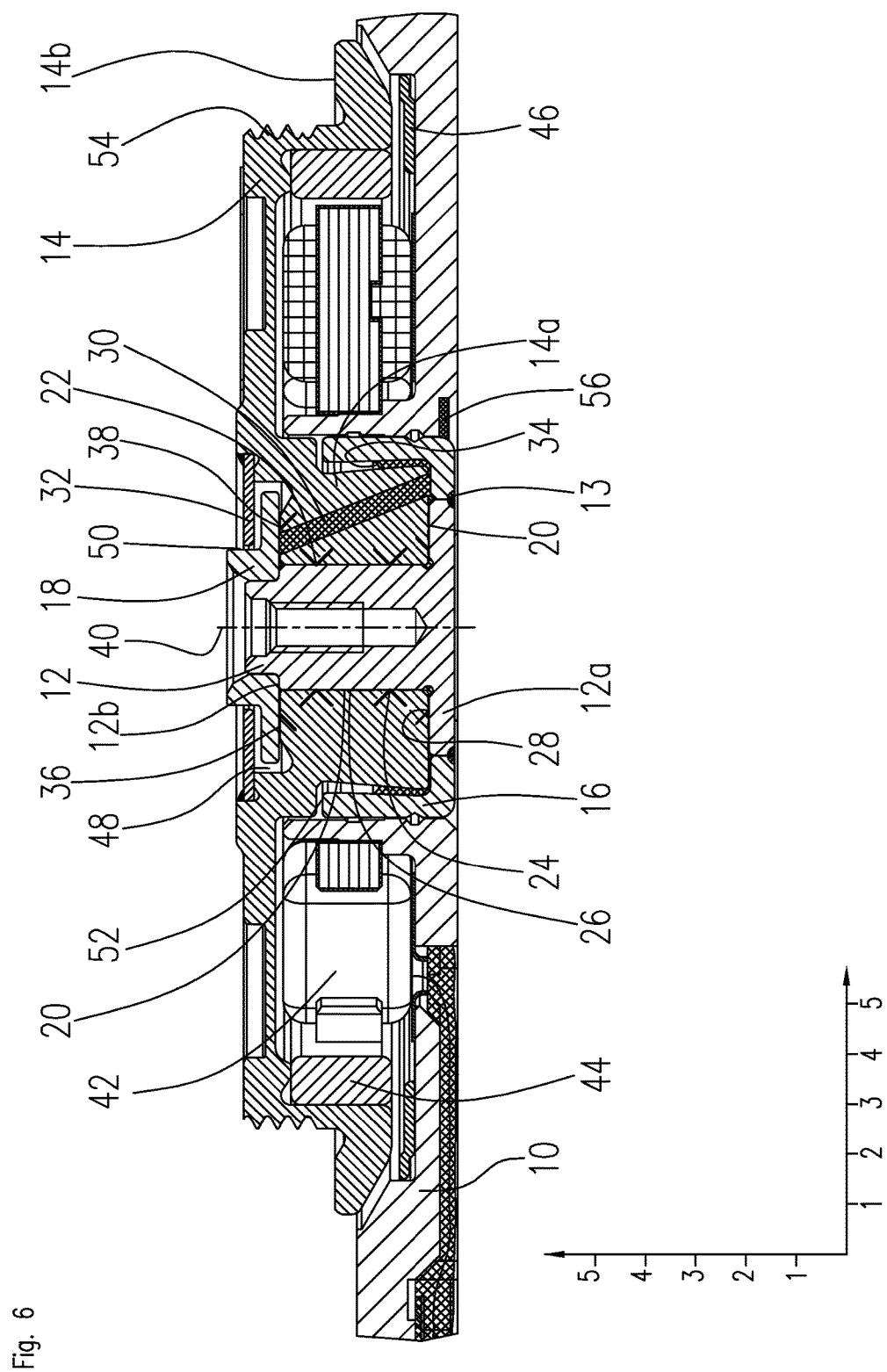

In FIG. 6, the groove 62 for the adhesive is shown to be substantially smaller in its radial dimension and depth than in comparison with FIG. 1. The cover 32 does not have a rim as in FIG. 1, but is formed as an annular disk. It contacts the edge of the rotor component 14 and has its outer diameter adhesively bonded to the inner diameter of the outer edge of the groove 62. The bulge extending upwards in the axial direction at the outer edge of the groove 62 has a greater radial extension than in FIG. 1.

Figure 7:
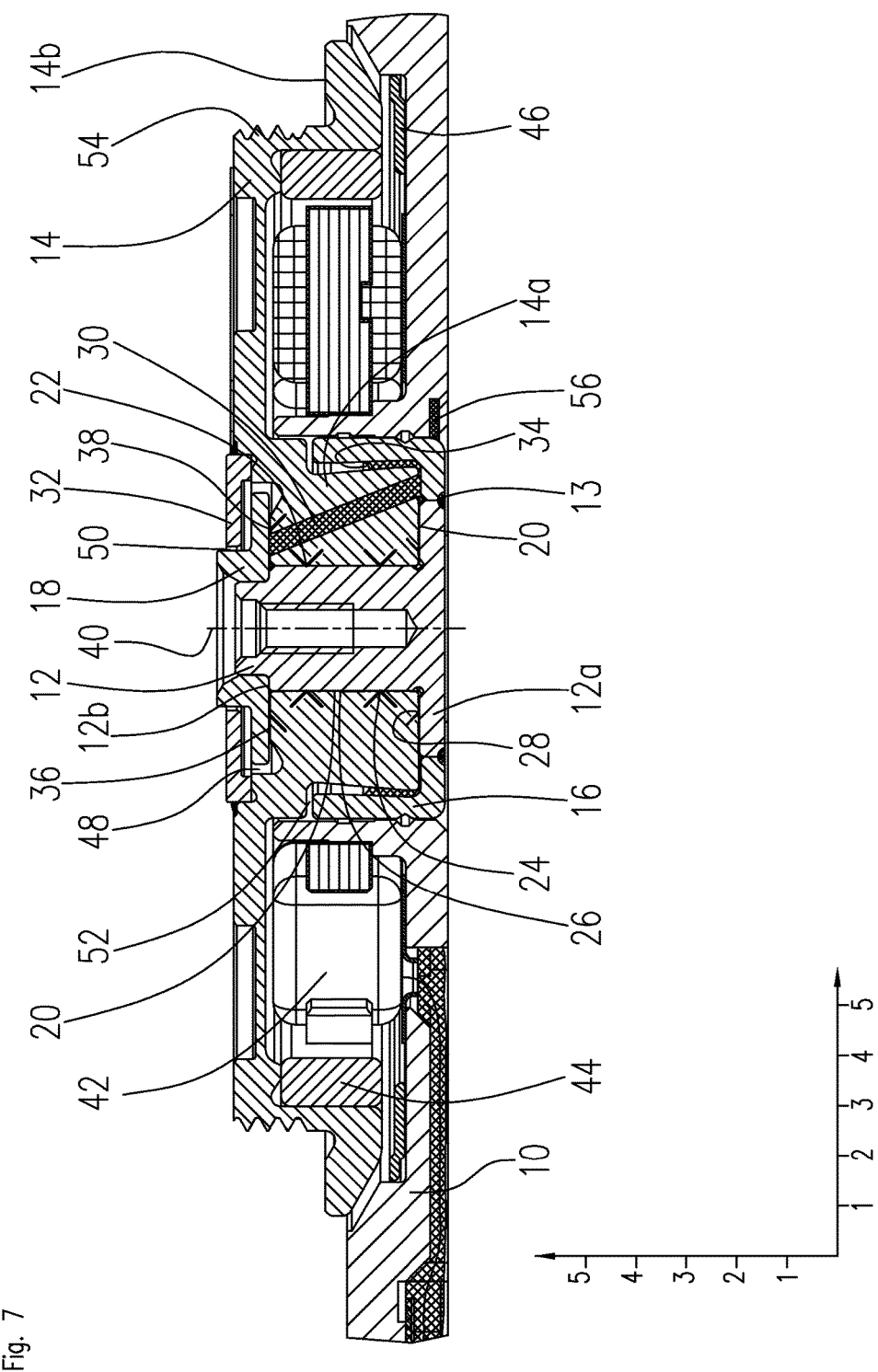
Figure 8:
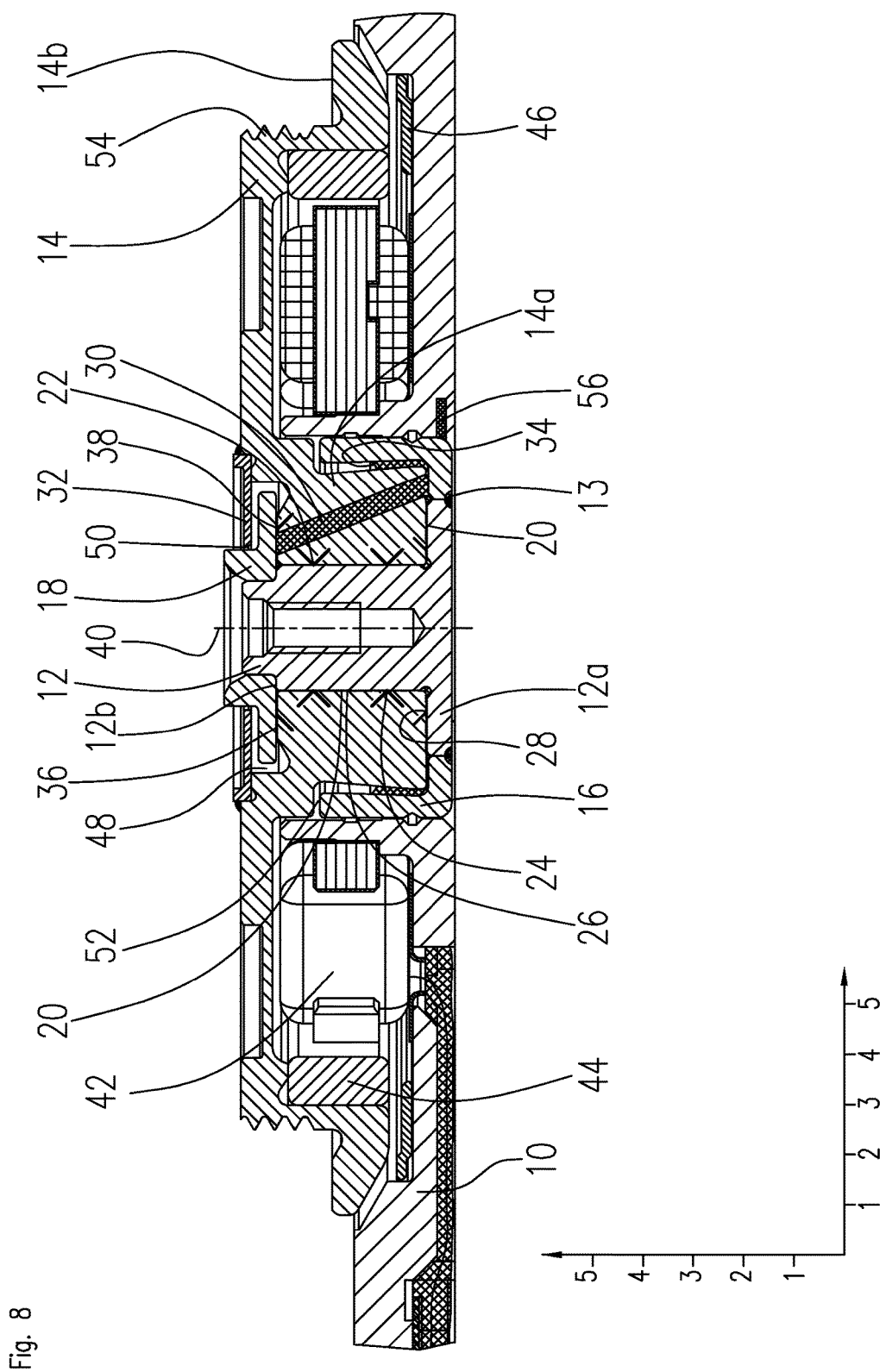

In FIG. 7 and FIG. 8, the cover 32 has a rim extending downwards and upwards, respectively, in the axial direction, to provide a greater joining area between the outer diameter of the cover 32 and the inner diameter of the edge of the groove 62. The bulge at the outer edge of the groove 62 is not provided in these embodiments, so that, as in FIG. 5, the end face of the rotor component 14 has a planar configuration from the outside toward the inside up to the groove 62.

Figure 9:
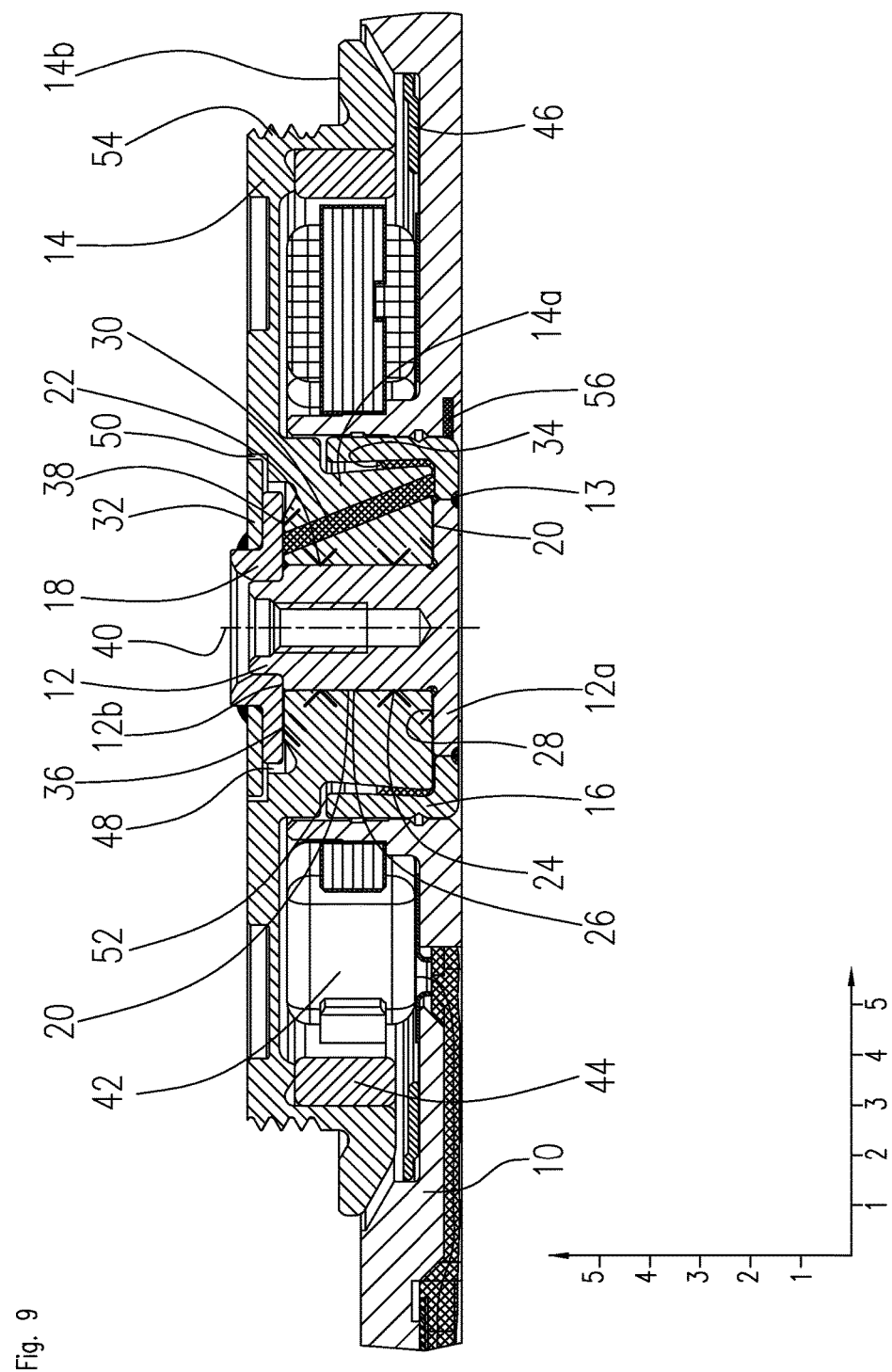

The cover 32 shown in FIG. 9 is formed as an annular disc without a rim as in FIG. 6. It has its inner circumference fixedly connected to the outer circumference of the stopper component 18 and sits on the enlarged section of the stopper component 18. The rotor component 14 does not have an edge, a groove or a bulge as in the previous figures. The end face of the rotor component 14 has a planar configuration up to the recess in which the cover 32 is received.

Figure 10:
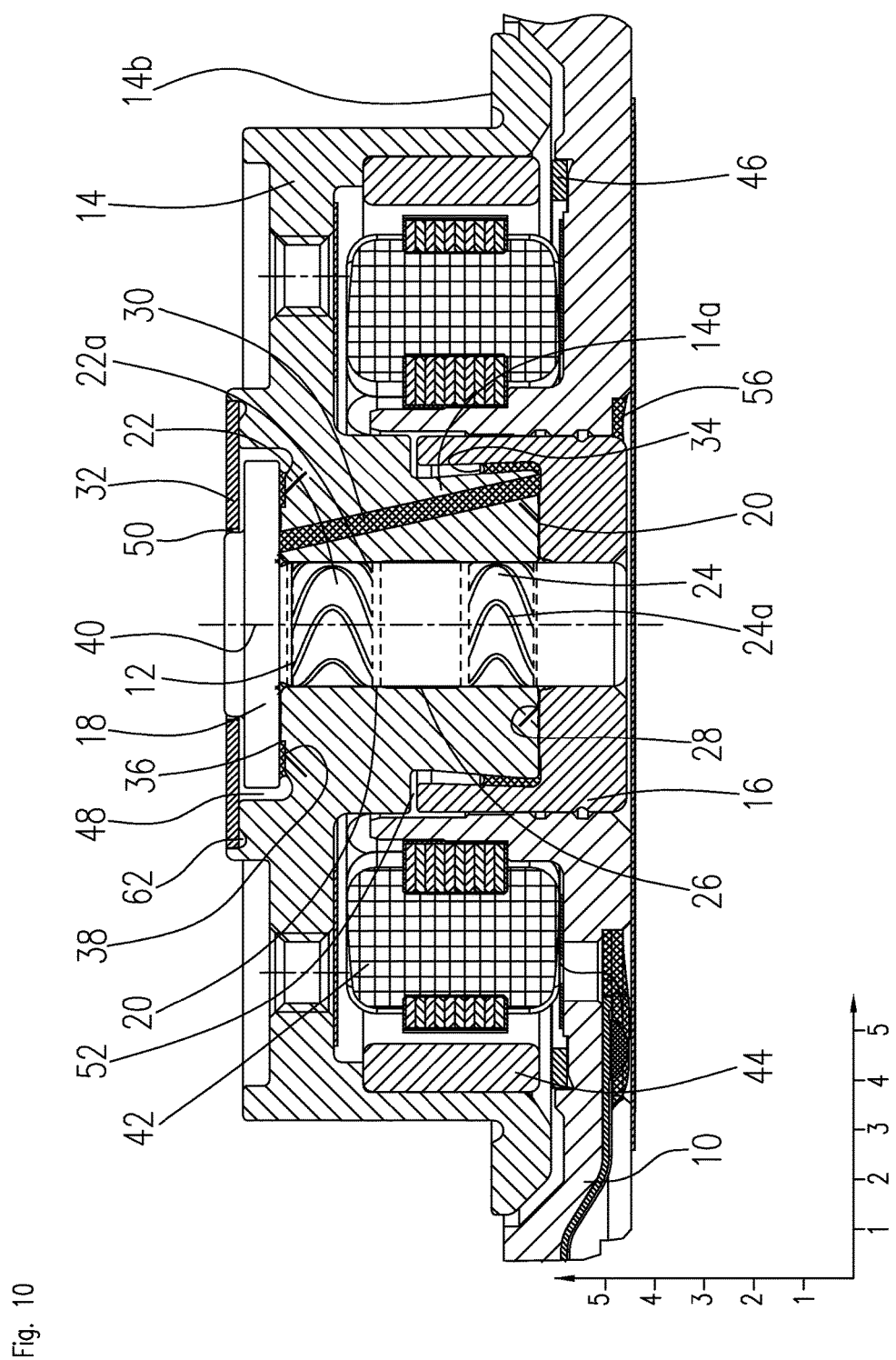
FIG. 10 shows a sectional view of another embodiment of the spindle motor similar to the spindle motor shown in FIG. 1 according to an embodiment of the invention.

FIG. 10 shows another embodiment of a spindle motor similar in structure to the spindle motor shown in FIG. 1, and primarily differing in its structural height. The shaft 12 is integrally formed with the stopper component 18 and does not have a flange at its bottom. The rotor component has no thread for the storage disk. Instead, the storage disks are fixed on the rotor component by means of a compression clip (not shown in the drawings).

The configuration of the sealing gap 36 is also different. A pump seal 38 extends along the entire sealing gap 36. The sealing gap 36 is expanded by means of a step in its radially outward area. The top end of the recirculation channel 30 opens out into the radially inwardly situated narrow section of the sealing gap 36.

Figure 11:
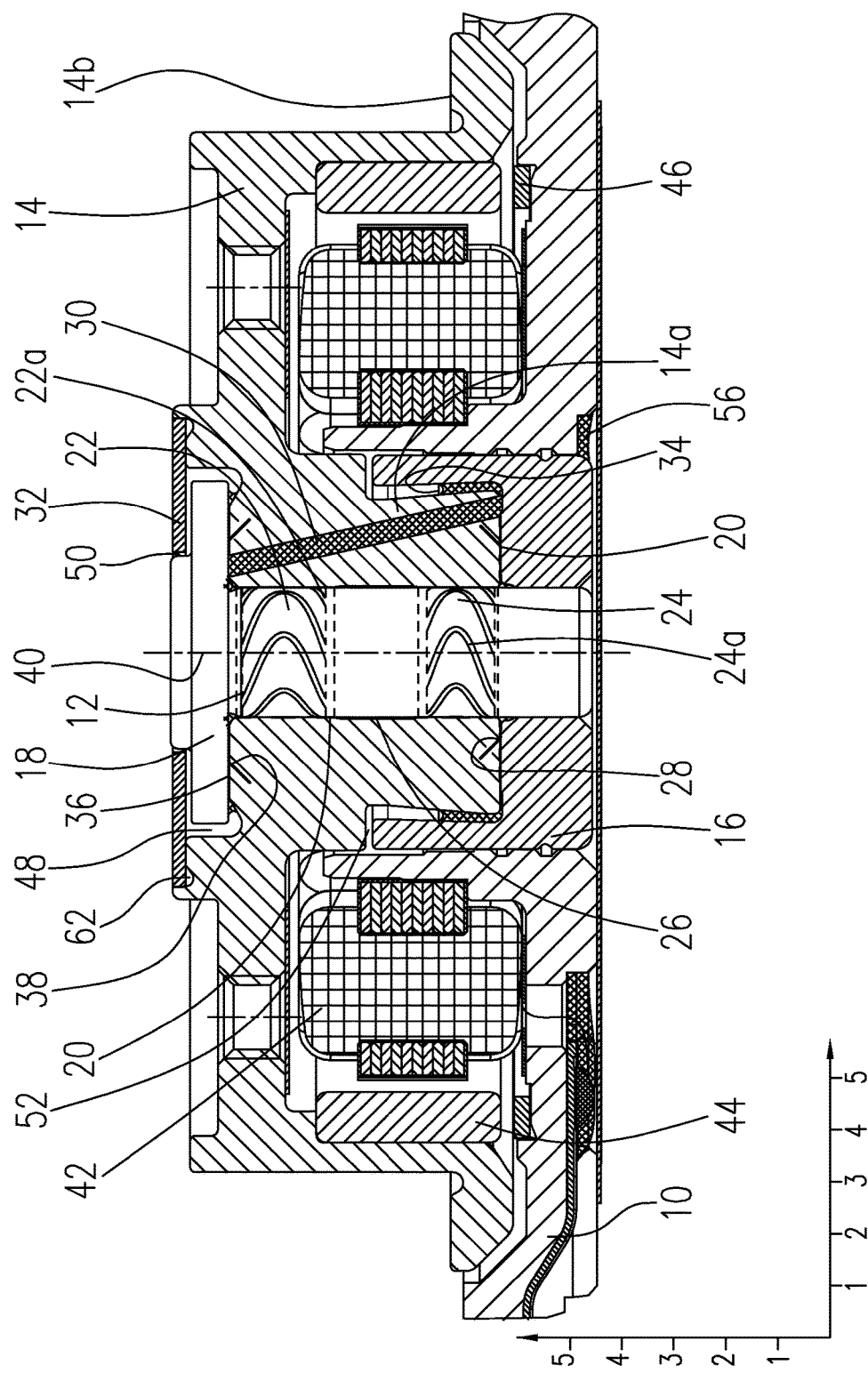
FIG. 11 shows another embodiment of the invention of the spindle motor shown in FIG. 10.

FIG. 11 shows another embodiment of the invention of the spindle motor shown in FIG. 10. The embodiment differs in that the sealing gap 36 has no step and thus a constant gap width until it conically expands at its radially outer end.

Figure 12:
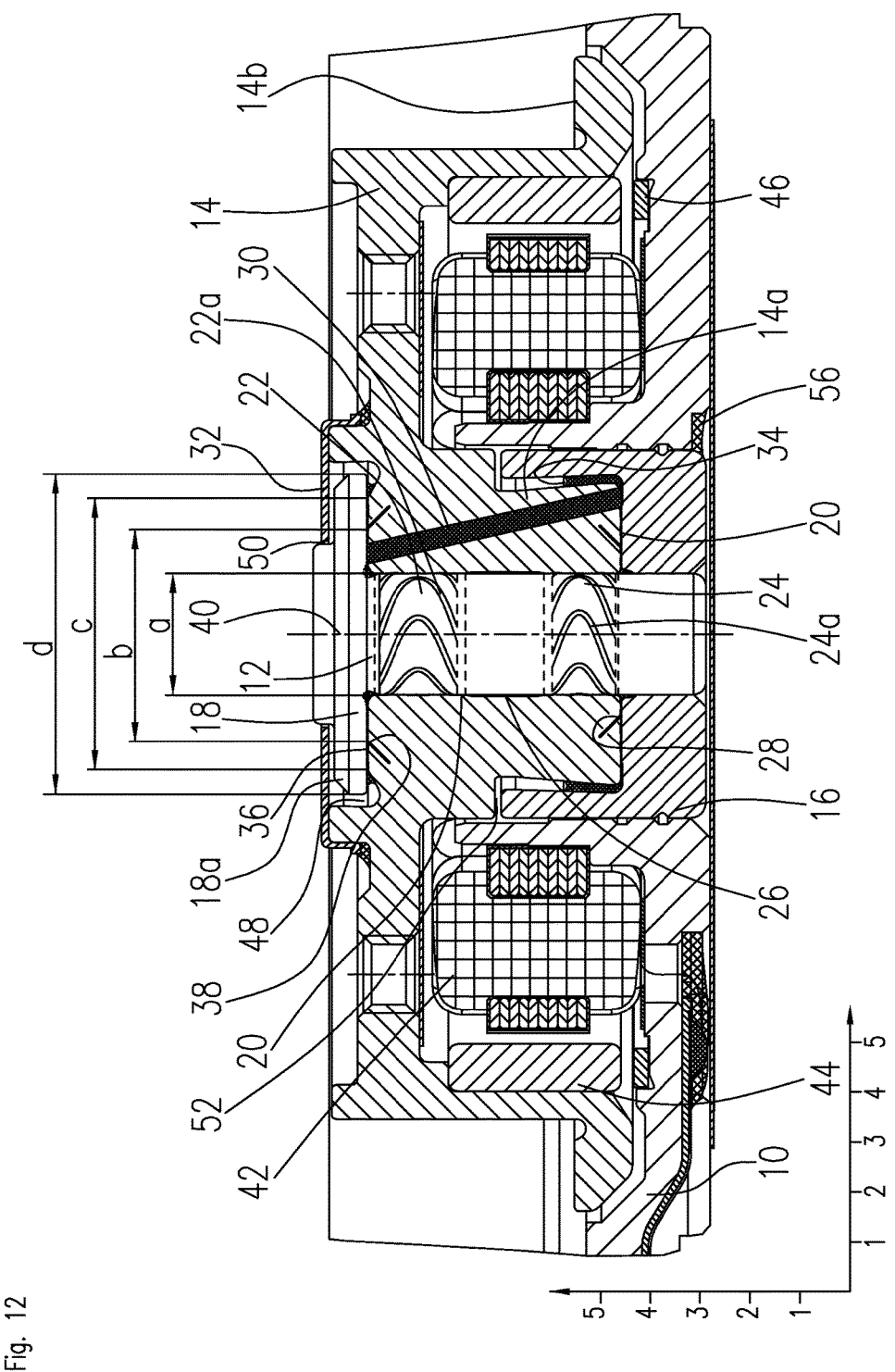
FIG. 12 shows another embodiment of the invention of the spindle motor shown in FIG. 1.

FIG. 12 shows another embodiment of a spindle motor similar in structure to the spindle motor shown in FIG. 1 and primarily differing in its structural height. The shaft 12 is integrally formed with the stopper component 18 and does not have a flange at its bottom. The surface of the stopper component 18 defining the axial gap 48 has a ramp 18a at its upper end, facilitating filling of the bearing via the axial gap 48. The rotor component 14 has no thread for the storage disk. Instead, the storage disks are fixed on the rotor component 14 by means of a compression clip (not shown in the drawings).

Figure 13:
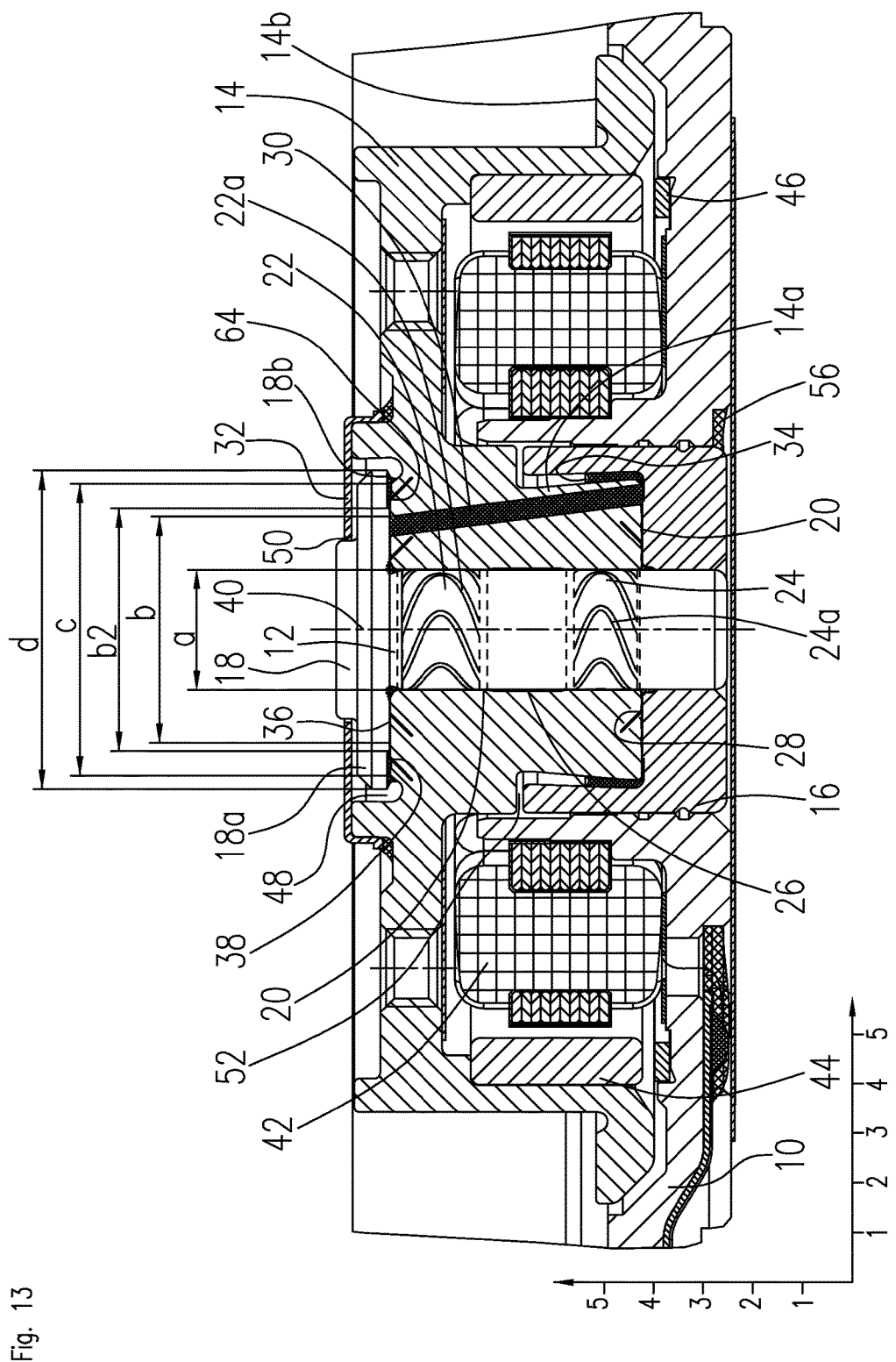
FIG. 13 shows another embodiment of the invention of the spindle motor shown in FIG. 12.

FIG. 13 shows another embodiment of a spindle motor similar in structure to the spindle motor shown in FIG. 12 and primarily differing in the configuration of the second sealing gap 36. The second sealing gap 36 comprises four sections. The first section begins at diameter a that is equal to the inner circumference of the bore of the bearing sleeve 14a and extends radially outward up to diameter b that describes the diameter on which the radially outermost area of the upper opening of the recirculation channel 30 is situated. In comparison to FIG. 12 the recirculation channel 30 shows less inclination regarding the rotation axis 40. Along this first section ab an optional second thrust bearing 64 is arranged.

The thrust bearing 64 is characterized, for example, by spiral-shaped bearing groove structures in the well-known manner, which can be formed either on the end face of the bearing sleeve 14a and/or on the stopper component 18. When the bearing is in operation, the bearing groove structures generate a pumping action on the bearing fluid present in the first section ab of the second sealing gap 36 towards the inside of the bearing, i.e. towards the shaft 12.

Contiguous to the first section ab of the second sealing gap 36 is a second section bb2, beginning at diameter b and extending radially outward to a diameter b2. Unlike to other shown embodiments, the surface of the stopper component 18 defining the second seal gap 36 does not continuously extend to its outer rim in a straight line, but has a step 18b upwards at the diameter b2. This second section bb2 is a continuation of the first section ab, has essentially the same gap width and forms a quiet zone.

The second section bb2 of the second sealing gap 36 is followed by a third section b2c extending radially outward from diameter b2 up to diameter c that is equal to the diameter at which the radially extending surface of the bearing sleeve 14a transitions into a surface extending obliquely downward. The angle of this obliquely downward extending surface can be, for example, between 60 and 90 degrees. The gap width in section b2c can be between 3 μm and 20 μm. A dynamic pump seal 38 can be arranged along this section b2c. The dynamic pump seal 38 comprises groove structures arranged on the surface defining the section b2c of the second sealing gap 36 of the stopper component 18 and/or preferably the surface of the bearing sleeve 14*a*. While the bearing is rotating, the groove structures of the pump seal 38 causes a pumping action on the hearing fluid present in the sealing gap 36. This pumping action is directed towards the inside of the bearing, thus towards the bearing gap 20, and conveys the bearing fluid towards the bearing gap 20.

The third section b2*c* is finally followed by the fourth section cd extending radially outward from diameter c up to diameter d that is equal to the diameter of the outer rim of the stopper component 18. The fourth section cd of the second sealing gap 36 is preferably a capillary sealing gap having a conical cross-section, i.e. the cross-section of section cd continuously expands starting from diameter c up to diameter d. During standstill of the bearing, a portion of section cd is preferably filled with bearing fluid, wherein the surface of the bearing fluid forms a meniscus 58.

LIST OF REFERENCE NUMERALS 10 base plate
12 shaft
12*a* flange
12*b* step on shaft
13 welding seam
14 rotor component
14*a* bearing sleeve
14*b* flange
16 bearing component
18 stopper component
18*a* ramp
18*b* step
20 bearing gap
22 radial bearing
22*a* bearing groove structures
24 radial bearing
24*a* bearing groove structures
26 separator section
28 thrust bearing
30 recirculation channel
32 cover
34 sealing gap
36 sealing gap
38 pump seal
38*a* pump groove structure
40 rotation axis
42 stator arrangement
44 rotor magnet
46 attractive plate
48 axial gap
50 gap seal
52 gap seal
54 thread
56 conductive adhesive
58 meniscus
60 circumferential groove
62 groove
64 thrust bearing
a, b, b1, b2, c, d diameters

The invention claimed is:

1. A fluid-dynamic bearing system comprising a stationary bearing component (12; 16, 18) and a bearing component (14, 14*a*) rotatable about a rotation axis, wherein, during operation of the bearing, the stationary and rotary components are separated from each other by a bearing gap (20) filled with bearing fluid, wherein at least one fluid-dynamic radial bearing (22, 24) and at least one fluid-dynamic thrust bearing (28) or, alternatively, at least one conical fluid-dynamic bearing are arranged along the bearing gap (20), and wherein the bearing gap (20) comprises first and second open ends sealed by a first sealing gap (34) and a second sealing gap (36), characterized in that the second sealing gap (36) exclusively extends normal to the rotation axis (40), in that the second sealing gap (36) comprises a plurality of sections, in that a sixth section of the plurality of sections of the second sealing gap (36) begins at a third diameter and ends at a fourth diameter radially further outward than the third diameter, in that at least one section of the plurality of sections of the second sealing gap (36) is radially further inward than the sixth section, and in that the gap width of the sixth section is larger than in the at least one section of the plurality of sections of the second sealing gap radially further inward than the sixth section.

2. The fluid-dynamic bearing system according to claim 1, characterized in that the first sealing gap (34) extends parallel to the rotation axis.

3. The fluid-dynamic bearing system according to claim 1, characterized in that the second sealing gap (36), with respect to the rotation axis (40), begins at an inner diameter radially further inward than the third diameter, extends radially outward, and ends at an outer diameter radially further outward than the fourth diameter.

4. The fluid-dynamic bearing system according to claim 1, characterized in that the second sealing gap (36) is arranged between a surface, extending vertical to the rotation axis (40), of the stationary bearing component (18), and a surface, at least partially extending vertical to the rotation axis (40), of the rotary component (14*a*) and is at least partially filled with bearing fluid.

5. The fluid-dynamic bearing system according to claim 1, characterized in that the plurality of sections of the second sealing gap (36) comprises a first section connected to the bearing gap (20), which first section begins at an inner diameter radially further inward than the third diameter and ends at a first diameter radially further outward than the inner diameter and radially further inward than the third diameter.

6. The fluid-dynamic bearing system according to claim 5, characterized in that an opening of a recirculation channel (30) opens out into the first section.

7. The fluid-dynamic bearing system according to claim 6, characterized in that a circumferential groove (60) is arranged in the first section.

8. The fluid-dynamic bearing system according to claim 5, characterized in that the first diameter is radially equal to a diameter on which a radially outermost area of an upper opening of a recirculation channel (30) is situated.

9. The fluid-dynamic bearing system according to claim 1, characterized in that the plurality of sections of the second sealing gap (36) comprises a third section beginning at the fourth diameter and ending at an outer diameter radially further outward than the fourth diameter.

10. The fluid-dynamic bearing system according to claim 9, characterized in that the third section is formed as a conical capillary seal having a cross-section enlarged starting from the fourth diameter up to the outer diameter.

11. The fluid-dynamic bearing system according to claim 1, characterized in that the plurality of sections of the second sealing gap (36) comprises a fourth section beginning at a first diameter radially further outward than an inner diameter and ending at a second diameter radially further outward than the first diameter and radially further inward than the third diameter.

12. The fluid-dynamic bearing system according to claim 11, characterized in that a dynamic pump seal (38) is not arranged along the fourth section.

13. The fluid-dynamic bearing system according to claim 1, characterized in that the second sealing gap (36), with respect to the rotation axis (40), begins at an inner diameter radially further inward than the third diameter, and extends radially outward, and in that the inner diameter is radially equal to an inner circumference of a bore of the bearing component (14a) rotatable about the rotation axis.

14. The fluid-dynamic bearing system according to claim 1, characterized in that the second sealing gap (36), with respect to the rotation axis (40), extends radially outward and ends at an outer diameter radially further outward than the fourth diameter, the outer diameter being radially equal to the outer circumference of the stationary bearing component (18).

15. A spindle motor having a fluid-dynamic bearing system according to claim 1.

16. The spindle motor according to claim 15 for driving a hard disk drive or a fan.

17. A fluid-dynamic bearing system comprising a stationary bearing component (12; 16, 18) and a bearing component (14, 14a) rotatable about a rotation axis, wherein, during operation of the bearing, the stationary and rotary components are separated from each other by a bearing gap (20) filled with bearing fluid, wherein at least one fluid-dynamic radial bearing (22, 24) and at least one fluid-dynamic thrust bearing (28) or, alternatively, at least one conical fluid-dynamic bearing are arranged along the bearing gap (20), and wherein the bearing gap (20) comprises first and second open ends sealed by a first sealing gap (34) and a second sealing gap (36), characterized in that the second sealing gap (36) exclusively extends normal to the rotation axis (40), characterized in that a fourth diameter of the second sealing gap (36) is radially equal to a diameter at which a radially extending surface of the bearing component (14a) rotatable about the rotation axis transitions into a surface obliquely extending downwards.

18. The fluid-dynamic bearing system according to claim 17, characterized in that the second sealing gap (36) comprises a second section beginning at a first diameter radially further inward than the fourth diameter and ending at the fourth diameter.

19. The fluid-dynamic bearing system according to claim 18, characterized in that a dynamic pump seal (38) is arranged along the second section, characterized by pump grooves arranged on at least one of the surfaces defining the second section.

20. The fluid-dynamic bearing system according to claim 17, characterized in that the second sealing gap (36) comprises a fifth section beginning at a second diameter radially further inward than the fourth diameter and ending at the fourth diameter.

21. The fluid-dynamic bearing system according to claim 20, characterized in that a dynamic pump seal (38) is arranged along the fifth section, which is characterized by pump grooves arranged on at least one of the surfaces defining the fifth section.

22. A spindle motor having a fluid-dynamic bearing system according to claim 17.

23. The spindle motor according to claim 22 for driving a hard disk drive or a fan.

24. The fluid-dynamic bearing system according to claim 17, characterized in that the first sealing gap (34) extends parallel to the rotation axis.

25. The fluid-dynamic bearing system according to claim 17, characterized in that the second sealing gap (36) is arranged between a surface, extending vertical to the rotation axis (40), of the stationary bearing component (18), and a surface, at least partially extending vertical to the rotation axis (40), of the rotary component (14a) and is at least partially filled with bearing fluid.

\* \* \* \* \*